United States Patent
Norman et al.

(10) Patent No.: US 9,485,651 B2
(45) Date of Patent: Nov. 1, 2016

(54) OAM APPARATUS FOR RADIO BASE STATION

(75) Inventors: Mårten Norman, Spånga (SE); Marie Sparr, Täby (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 6 days.

(21) Appl. No.: 14/396,502

(22) PCT Filed: Apr. 23, 2012

(86) PCT No.: PCT/SE2012/050424
§ 371 (c)(1),
(2), (4) Date: Oct. 23, 2014

(87) PCT Pub. No.: WO2013/162429
PCT Pub. Date: Oct. 31, 2013

(65) Prior Publication Data
US 2015/0304840 A1    Oct. 22, 2015

(51) Int. Cl.
*H04M 1/68* (2006.01)
*H04W 12/04* (2009.01)
*H04W 24/02* (2009.01)
*H04W 12/06* (2009.01)
(Continued)

(52) U.S. Cl.
CPC .......... *H04W 12/04* (2013.01); *H04L 41/0631* (2013.01); *H04L 63/0838* (2013.01); *H04L 63/18* (2013.01); *H04W 12/06* (2013.01); *H04W 24/02* (2013.01); *H04W 12/02* (2013.01); *H04W 88/02* (2013.01); *H04W 88/08* (2013.01)

(58) Field of Classification Search
CPC ............... H04W 24/02; H04W 88/08; H04W 52/0206; H04W 84/045; H04W 24/10; H04W 52/343; H04W 24/04; H04W 36/08; H04W 48/20; H04W 84/18

USPC ........................................................ 455/411
See application file for complete search history.

(56) References Cited

U.S. PATENT DOCUMENTS

2009/0097459 A1    4/2009  Jendbro et al.

FOREIGN PATENT DOCUMENTS

| EP | 2073574 A1 | 6/2009 |
|---|---|---|
| WO | WO-0207467 A1 | 1/2002 |
| WO | WO-2004075583 A1 | 9/2004 |

OTHER PUBLICATIONS

International Search Report and the Written Opinion of the International Searching Authority for International Application No. PCT/SE2012/050424, mailed May 6, 2013, 16 pages.

*Primary Examiner* — Kwasi Karikari
(74) *Attorney, Agent, or Firm* — Patents on Demand, P.A.; Brian K. Buchheit; Scott M. Garrett

(57) ABSTRACT

The present invention relates to an OAM apparatus for a radio base station. The OAM apparatus comprises an OAM receiver configured for receiving an electronic code key. The apparatus also comprises a storage unit comprising a list of code keys of which at least one of said code keys is valid. The apparatus further comprises a processing unit configured for determining whether a received code key is comprised in said list and whether said received code key is valid, and for invalidating said received code key in said list for preventing repeated use of the code key. The apparatus also comprises an OAM transmitter configured for being in a silent unless activated. The OAM apparatus is configured for wireless communication with an OAM terminal over a wireless OAM link if it has been determined that the received code key is valid and if the OAM transmitter has been activated.

13 Claims, 6 Drawing Sheets

(51) Int. Cl.
  *H04L 12/24* (2006.01)
  *H04L 29/06* (2006.01)
  *H04W 12/02* (2009.01)
  *H04W 88/02* (2009.01)
  *H04W 88/08* (2009.01)

ately alleviate a problem with the prior art.

OAM APPARATUS FOR RADIO BASE STATION

CROSS-REFERENCE TO RELATED APPLICATIONS

This application is a National stage of International Application No. PCT/SE2012/050424, filed Apr. 23, 2012, which is hereby incorporated by reference.

TECHNICAL FIELD

The invention relates to an operations, administration and maintenance (OAM) apparatus for a radio base station (RBS). The invention is further related to an RBS comprising such an OAM apparatus, a method of an OAM apparatus and a computer program and computer program product of an OAM apparatus, as well as to an OAM terminal, an OAM control centre and an OAM system.

BACKGROUND

Radio base stations (RBS) generally have some connection or terminal for local management (OAM), where a site technician on site may change settings, check status and upload/download files (like software, logs, scripts). This is used when a site technician physically visits an RBS site in order to install/repair/modify/maintain/check/troubleshoot the RBS. The main reasons for having a local OAM connection are:

Convenience: There is often a remote OAM connection too, but that terminal may be located in a control centre far, far away—while the RBS is close. Hence it is a logical convenience to be able to connect to a local terminal.

Availability: A remote OAM connection depends on a transport connection for OAM to be active and working. Hence it may be unavailable. A local connection at the RBS and/or RBS site is more reliable and easier to keep available even during installation/repair etc. when parts of the RBS and/or the transport network for the RBS may be inactive, broken or not yet installed.

Typically, an OAM terminal is connected to the RBS via a wire. A typical terminal is a standard laptop with a standard web browser and/or special OAM software, or a Smart-Phone or special hardware, with means to wiredly connect to the RBS and control/monitor the RBS.

It has to be possible to connect the OAM terminal to the RBS. This conflicts with the desire to install RBS's at locations that are cheap and/or has good radio coverage. In general, an RBS should be in a high location (to get coverage), in a location far away or where it is hard to reach or get access (to get cheap rent).

This conflict between easy physical access and RBS location increases due to RBS's becoming smaller and cheaper and the need to fit more RBS's closer to people in order to get more bandwidth for mobile broadband, hence they are often mounted at hard-to-reach-places like, close to or even inside the antenna i.e. at the top of an antenna tower or at high buildings, inside elevator and ventilation shafts, several meters up on walls, light poles etc. i.e. using space that is not needed by humans and vehicles in a crowded city where any useful space has a premium price tag.

There may also be working security considerations as an RBS located in the antenna may be dangerous to go near when the transmitter is on.

SUMMARY

It is an objective of the present invention to at least alleviate a problem with the prior art.

According to one aspect of the present invention, there is provided an operations, administration and maintenance (OAM) apparatus for a radio base station (RBS). The OAM apparatus comprises an OAM receiver configured for receiving an electronic code key. The apparatus also comprises a storage unit comprising a list of code keys of which at least one of said code keys is valid. The apparatus further comprises a processing unit configured for determining whether a received code key, received by the OAM receiver, is comprised in said list in the storage unit and whether said received code key is valid, and for invalidating said received code key in said list for preventing repeated use of the code key, if it has been determined that the received code key is valid. The apparatus also comprises an OAM transmitter configured for being in a silent mode unless activated to an active mode, where said transmitter is allowed to wirelessly transmit signals, in response to the OAM apparatus receiving an unlock signal. The OAM apparatus is configured for wireless communication with an OAM terminal over a wireless OAM link if it has been determined that the received code key is valid and if the OAM transmitter has been activated.

According to another aspect of the present application, there is provided an operations, administration and maintenance (OAM) apparatus for a radio base station (RBS). The OAM apparatus comprises means for holding a list of code keys of which at least one of said code keys is valid. The apparatus also comprises means for receiving an electronic code key. The apparatus further comprises means for determining whether the received code key is comprised in said list and whether said received code key is valid. The apparatus also comprises means for invalidating said received code key in said list for preventing repeated use of said received code key, if it has been determined that the received code key is valid. The apparatus further comprises means for activating an OAM transmitter of the OAM apparatus, taking said transmitter from a silent mode to an active mode where said transmitter is allowed to wirelessly transmit signals, in response to the OAM apparatus receiving an unlock signal. The apparatus also comprises means for communicating with an OAM terminal over a wireless OAM link if it has been determined that the received code key is valid and if the OAM transmitter has been activated.

According to another aspect of the present invention, there is provided a radio base station (RBS) for communication with at least one wireless user equipment (UE) over a wireless interface over a radio unit within a wireless communication network. The RBS comprises an OAM apparatus according to any of the aspects above. The OAM link is separate from the wireless communication network.

According to another aspect of the present invention, there is provided a method of an operations, administration and maintenance (OAM) apparatus for a radio base station (RBS). The method comprises holding a list of code keys of which at least one of said code keys is valid. The method also comprises receiving an electronic code key. The method further comprises determining whether the received code key is comprised in said list and whether said received code key is valid. The method also comprises invalidating said received code key in said list for preventing repeated use of said received code key, if it has been determined that the received code key is valid. The method further comprises activating an OAM transmitter of the OAM apparatus, taking said transmitter from a silent mode to an active mode where said transmitter is allowed to wirelessly transmit signals, in response to the OAM apparatus receiving an unlock signal. The method also comprises communicating with an OAM terminal over a wireless OAM link if it has been determined that the received code key is valid and if the OAM transmitter has been activated.

The apparatus and/or RBS aspects above of the present invention may be used for performing the method aspect above of the present invention.

According to another aspect of the present invention, there is provided a computer program product comprising computer-executable components for causing an OAM apparatus to perform the method aspect above of the present invention when the computer-executable components are run on a processing unit included in the OAM apparatus.

According to another aspect of the present invention, there is provided a computer program for an OAM apparatus. The computer program comprises computer program code which is able to, when run on the OAM apparatus, cause said apparatus to receive an electronic code key. The computer program code is also able to cause the apparatus to determine whether the received code key is comprised in a list of code keys held by the OAM apparatus of which at least one of said code keys is valid, and to determine whether said received code key is valid. The computer program code is further able to cause the apparatus to invalidate said received code key in said list for preventing repeated use of said received code key, if it has been determined that the received code key is valid. The computer program code is also able to cause the apparatus to activate an OAM transmitter of the OAM apparatus, taking said transmitter from a silent mode to an active mode where said transmitter is allowed to wirelessly transmit signals, in response to the OAM apparatus receiving an unlock signal. The computer program code is further able to cause the apparatus to communicate with an OAM terminal over a wireless OAM link if it has been determined that the received code key is valid and if the OAM transmitter has been activated.

According to another aspect of the present invention, there is provided a computer program product comprising a computer program of the above aspect of the present invention and a computer readable means on which the computer program is stored.

According to another aspect of the present invention, there is provided a method of an OAM terminal. The method comprises wirelessly sending an electronic code key and an identifier for an OAM apparatus of a radio base station (RBS), without previously having received any signal from said OAM apparatus. The method also comprises communicating with the OAM apparatus over a wireless OAM link.

According to another aspect of the present invention, there is provided a computer program product comprising computer-executable components for causing an OAM terminal to perform the OAM terminal method aspect above of the present invention when the computer-executable components are run on a processing unit included in the OAM terminal.

According to another aspect of the present invention, there is provided a computer program for an OAM terminal. The computer program comprises computer program code which is able to, when run on the OAM terminal, causes said terminal to wirelessly send an electronic code key and an identifier for an OAM apparatus of a radio base station (RBS), without previously having received any signal from said OAM apparatus. The computer program code is also able to cause the terminal to communicate with the OAM apparatus over a wireless OAM link.

According to another aspect of the present invention, there is provided a computer program product comprising a computer program according to the computer program aspect above for a terminal, and a computer readable means on which the computer program is stored.

According to another aspect of the present invention, there is provided an OAM terminal comprising a computer program product according to any of the OAM terminal computer program product aspects above, or configured with a computer program according to the OAM terminal computer program aspect above.

According to another aspect of the present invention, there is provided a control centre comprising a one-time key server holding a plurality of lists, each of said lists being associated with a respective radio base station (RBS). The control centre also comprising a control server configured for selecting a valid key from a first list of said plurality of lists, said first list being associated with a first RBS, for activating a transmitter of an OAM apparatus of said first RBS.

According to another aspect of the present invention there is provided an OAM system. The OAM system comprises an RBS according to the RBS aspect above of the present invention. The OAM system also comprises an OAM terminal according to the OAM terminal aspect above of the present invention. The OAM system further comprises a control centre according to the control system aspect above of the present invention.

An advantage of the present invention is that it allows for wireless radio communication with an OAM apparatus for an RBS. It may thus not be necessary for an operator to get into physical contact with the OAM apparatus and establish a wired connection to the OAM apparatus. This may be advantageous since the OAM apparatus, possibly integrated in the RBS, may be located in a position which may be hard to reach for a human operator, such as on a roof top or on the facade of a building, especially in an urban environment. The wireless communication is partly enabled by the OAM transmitter of the OAM apparatus being silent and thus not allowing detection of the wireless interface by unauthorised entities. The OAM transmitter is only activated upon reception of an unlock signal. Since the RBS may handle and contain private and secret information, it may be important to prevent unauthorized access to the OAM apparatus and possibly thus to the RBS. It is of course also important to prevent unauthorised access in order to ensure intended operation of the OAM apparatus and RBS. By means of the present invention, the wireless interface is hidden, and thus not accessible, to non-authorised operators, whereby it may be acceptable to allow use of wireless communication with the OAM apparatus for an authorised operator. The wireless communication is also partly enabled by allowing the use of single use code keys which may be used for activating the OAM transmitter and/or for encryption of the wireless communication with the OAM apparatus, thus further preventing unauthorised access to the OAM apparatus via the wireless interface.

The discussions above and below in respect of any of the aspects of the invention are also in applicable parts relevant to any other aspect of the present invention.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
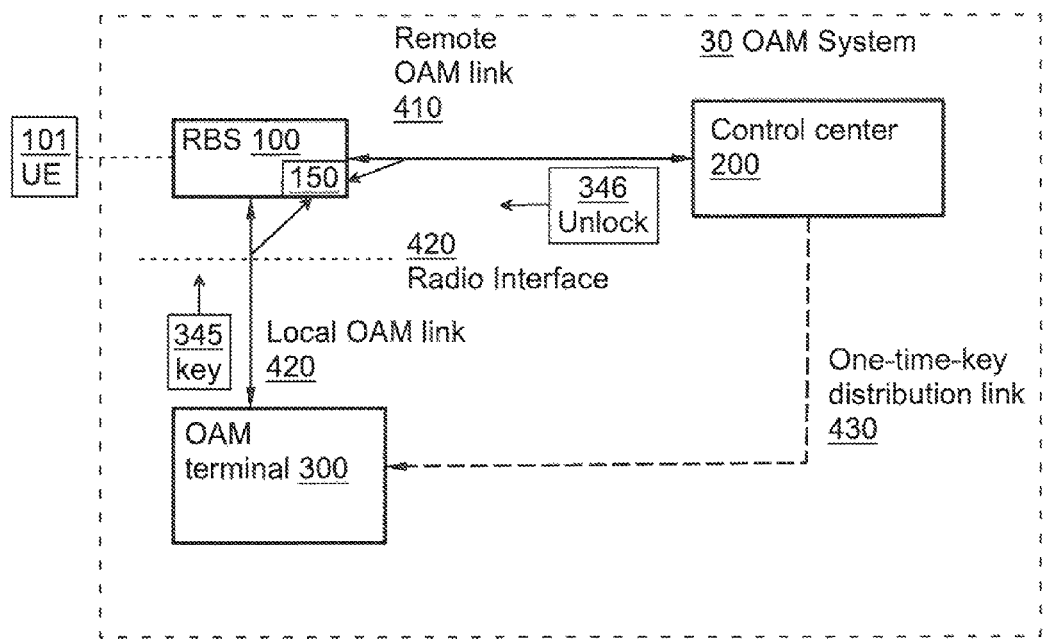
FIG. 1 is a schematic box diagram of an embodiment of an OAM system of to the present invention.

FIG. 1 is a schematic illustration of an embodiment of an OAM system 30 of the present invention.

The OAM system 30 comprises, comprises a part of or is associated with, a radio base station (RBS) 100. The RBS 100 may be any type of suitable RBS, e.g. of a cellular communication system, configured to serve/be connected to a wireless communication terminal or user equipment (UE) 101 in a communication network. Suitable RBSs include RBSs in accordance with Global System for Mobile Communications (GSM), Universal Mobile Telecommunication System (UMTS), Long Term Evolution (LTE), Wideband Code Division Multiple Access (WCDMA), Ultra Mobile Broadband (UMB), High-Speed Packet Access (HSPA), ad hoc networks such as Bluetooth, Worldwide Interoperability for Microwave Access (WiMAX), Institute of Electrical and Electronics Engineers (IEEE). Suitable RBSs may thus include e.g. a GSM base station, Node B (NB), eNode B (eNB) or any other 2G, 3G, 4G, or WiFi base transceiver station.

The RBS 100 comprises or is associated with an OAM apparatus 150 of the present invention, for maintenance, configuring, updating etc. of the RBS. The OAM apparatus is further discussed e.g. with reference to FIG. 4.

The OAM system 30 may comprise a control centre 200 which may be a central OAM node for remote OAM interaction with the RBS 100, typically via the OAM apparatus 150. The control centre may have a wired connection to the RBS 100 or OAM apparatus 150. This wired connection is in FIG. 1 called a remote OAM link 410. Alternatively, it may be a wireless connection which may be effectively similar to a wired connection, for example a microwave link. The remote OAM link 410 may provide for secure wired and/or encrypted communication with the RBS 100 or OAM apparatus 150, why sensitive or secret communications may be sent via the remote OAM link 410. An example of such sensitive communication is the sending of an unlock signal 346 which in some embodiments of the present invention may be sent over the wired remote OAM link 410 from the control centre 200 to the OAM apparatus 150. The control centre is further discussed e.g. with reference to FIG. 11. The unlock signal 346, according to some embodiments of the present invention, may activate a wireless local OAM link or radio interface 420 of the RBS 100, typically to or via the OAM apparatus 150.

The unlock signal 346 as discussed herein is a signal which is received by the OAM apparatus 150 of the present disclosure. The receiving of the unlock signal takes the OAM transmitter 157 from a silent mode to an active mode. In the silent mode the transmitter is not allowed to transmit any wireless signals thus being silent and not enabling detection of a wireless interface of the OAM apparatus. In the active mode, the transmitter is allowed to wirelessly transmit signals, whereby wireless communication with the OAM terminal 300 is enabled over the wireless OAM link 420.

Thus, the OAM apparatus 150 may be configured for receiving the unlock signal 346 from a control centre 200, typically over a wired remote OAM link 410. The Remote OAM link 410 may be trusted and secure since it may have full control over the RBS and may allow the control centre 200 to perform potentially dangerous operations that makes the RBS non-working and/or removes security measures. This is pointed out to make it clear to those skilled in the art that remote link 410 and RBS 100 may be considered to be a secure system under control of control centre 200.

Figure 2:
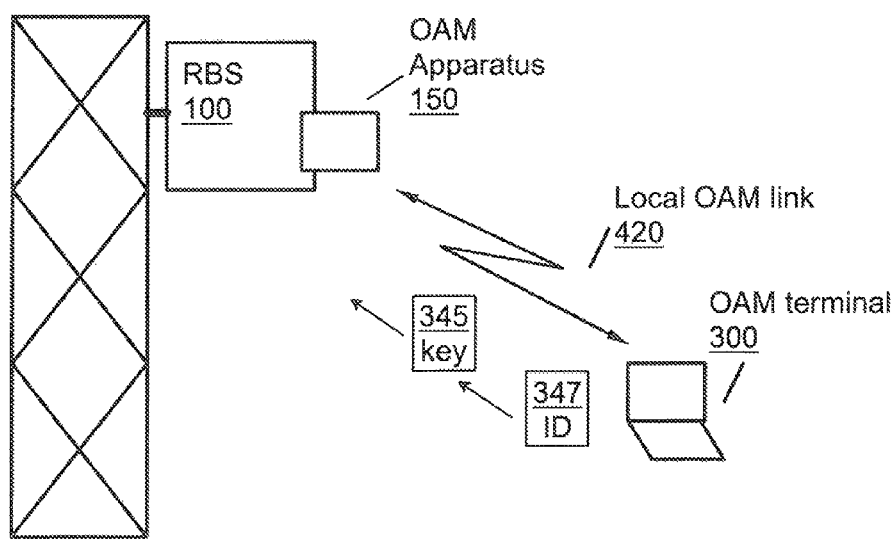
FIG. 2 is a schematic box diagram an embodiment of communication between an OAM terminal and an OAM apparatus of an RBS, of the present invention.

Regardless of how the local OAM link or radio interface 420 is activated, it is configured for wireless communication between the RBS 100 or its OAM apparatus 150 and an OAM terminal 300. The OAM terminal 300 may be any terminal able to wirelessly connect via the local OAM link 420. The terminal 300 may e.g. be a portable computer or a smartphone, possibly with custom software and/or hardware to function as an OAM terminal. The OAM link 420 may e.g. be a WiFi or WLAN link e.g. according to an IEEE standard, such as a 802.11 WLAN. It may be advantageous to use WLAN since a standard equipment, such as a mobile phone or portable computer with wireless communication abilities might then be used as OAM terminal in accordance with the present invention. Thus, the OAM apparatus 150 may be configured for performing the wireless communication with the OAM terminal 300 in accordance with a wireless local area network (WLAN) communication standard. The OAM terminal may typically be in close vicinity of the RBS or OAM apparatus, but it may be more practical to use wireless radio communication instead getting in wired physical contact. The local OAM link 420 may e.g. be used by the OAM terminal 300 to send a code key 345 to the OAM apparatus 150. According to some embodiments of the present invention, this code key may be used to verify that the terminal 300 is authorised to communicate with the OAM apparatus 150, e.g. by the OAM apparatus comparing the code key 345 received from the terminal 300 with a list of code keys held by the OAM apparatus or the RBS 100 to determine whether said code key 345 is valid and thus whether the terminal 300 is properly authorised to communicate with the OAM apparatus and/or the RBS. According to some embodiments of the present invention, the code key may, additionally or alternatively, be used as, or as part of the unlock signal 346. The unlock signal may be sent to the OAM apparatus 150 from the control centre 200, as discussed before, or from the OAM terminal 300. In either case, the unlock signal may be or comprise a code key 345. If the unlock signal 346 is sent from the terminal 300, it may be sent prior to the activation of the local OAM link 420, i.e. the transmitter of the OAM apparatus 150 may be silent and not in any way broadcast or otherwise signal the existence of a wireless connectability to the OAM apparatus. However, if the terminal 300, or the operator of the terminal, is aware that it should be possible to communicate wirelessly with the OAM apparatus 150, it may still send the unlock signal, possibly including or together with an identifier for the OAM apparatus 150 and/or the local link 420. Although the OAM apparatus, specifically its transmitter, is silent, it, specifically its receiver, may still listen for wireless signalling. If an unlock signal, and possibly an identifier, is received from an authorised terminal 300, a transmitter of the OAM apparatus 150 and the local link 420 may be activated. This is further illustrated in FIG. 2 where an OAM terminal 300 in the form of a laptop computer wirelessly sends a code key 345 and an identifier 347 to an OAM apparatus 150 of an RBS 100 mounted e.g. high up on a mast or a facade. One or both of the code key 345 and the identifier 347 may be regarded as part of an unlock signal 346 for activating the local OAM link 420, if the local link 420 is not already active e.g. by being activated by means of an unlock signal from the control centre 200.

The identifier 347 discussed herein is a code, number, name or such which is associated with the OAM apparatus 150, the RBS 100 comprising the OAM apparatus, the wireless network of the OAM apparatus or such. The identifier identifies the OAM apparatus such that when the OAM apparatus receives an identifier related to said OAM apparatus, it provides an indication that the sender of the identifier is attempting to contact the OAM apparatus and is aware of the OAM apparatus being able to communicate wirelessly. The identifier may be secret and only be known to operators authorized to wirelessly communicate with the OAM apparatus, in which case the identifier may function as an unlock signal 346, optionally in combination with the code key 345. Alternatively, the identifier may be an RBS identity 111 which may be a number, name or other label that uniquely identifies the RBS, discussed below in relation to FIG. 3, in which case the identifier may be generally known and not used as an unlock signal. The identifier is below exemplified by an SSID (Service Set Identifier).

Thus, according to some embodiments of the present invention, the unlock signal 346 may comprise the code key 345 and the OAM transmitter 157 (see FIG. 4) may be configured for being activated in response to the processing unit 520 determining that the received code key 345 is valid.

It may be convenient to combine the functions of the unlock signal and the code key and/or generate them from the same key in list (500) if possible.

The code key 345, e.g. received from the OAM terminal 300, may additionally or alternatively be used for encryption of transmissions and/or decryption of received data in encrypted communication between the terminal 300 and the OAM apparatus 150. In some embodiments of the present invention, the same part of the code key 345 and/or unlock signal 346 may be used for activating the wireless transmitter of the OAM terminal, i.e. activating the local link 420, and for encryption of communication between the terminal 300 and the OAM apparatus 150. In some embodiments, different parts of the code key 345 and/or unlock signal 346 may be used for activating the wireless transmitter of the OAM terminal, i.e. activating the local link 420, and for encryption of communication between the terminal 300 and the OAM apparatus 150. In some embodiments, the unlock signal 346 is sent to the OAM apparatus separate from the code key 345, whereby the unlock signal may be used to activate the local wireless link 420 and the code key 345 may be used to verify that the terminal 300 is authorised and/or for encrypting communication between the terminal 300 and the OAM apparatus 150.

Thus, the OAM apparatus 150 may be configured for encrypted wireless communication with the OAM terminal 300 over the wireless OAM link 420. Additionally, the OAM apparatus 150 may be configured for using the received code key 345 for the encrypted wireless communication. In this way, a secure wireless communication may be achieved by using the code key for determining whether a terminal 300 is authorised to communicate with the apparatus 150 and for encrypting the wireless communication to prevent eavesdropping.

FIG. 1 also indicates, with a dashed arrow, a connection 430 between the control centre 200 and the OAM terminal 300. This is intended to illustrate that the control centre may authorize the OAM terminal for communication with the OAM apparatus 150, e.g. by supplying the terminal 300 with a valid code key 345, identifier 347 and/or unlock signal 346. The supplying may be via a secure wired or wireless connection between the control centre 200 and the terminal 300, or it may e.g. be via a printed work order at least partly from the control centre to a human operator of the terminal 300, whereby the operator may input information for the code key 345, identifier 347 and/or unlock signal 346 into the terminal 300 prior to initiating communication with the OAM apparatus 150. The connection 430 between the control centre and the OAM terminal may thus be direct or indirect, e.g. for distribution of a one-time key 345 to the terminal 300 as in accordance with some embodiments of the present invention. The control centre 200 may be configured to electronically send a valid key 345 from a first list 500 (see FIG. 11) to the OAM terminal 300 over the distribution link 430.

Figure 3:
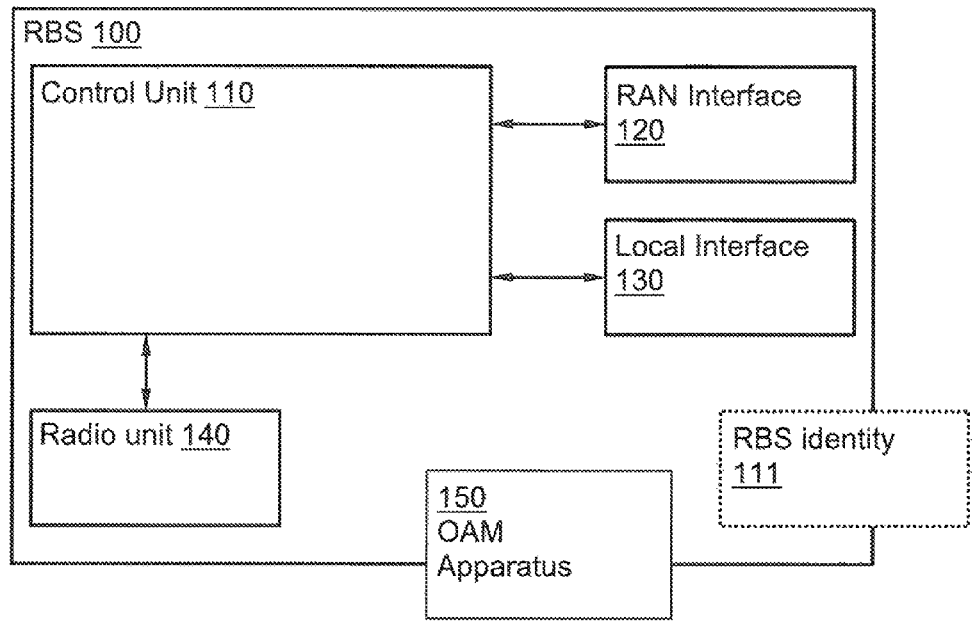
FIG. 3 is a schematic box diagram of an embodiment of an RBS of the present invention.

FIG. 3 schematically illustrates an embodiment of a radio base station 100 of the present invention.

The RBS 100 may comprise a control unit 110 configured for storing data and running software which controls the RBS. The RBS 100 may have a RAN interface 120 able to connect the RBS e.g. to a radio access network (RAN), typically comprising nodes to interconnect/switch data/voice traffic between RBSs and other networks like PSTN (Public Switched Telephone Network) internet and intranets/servers, and/or to the control centre 200 over link 410, possibly via the OAM apparatus 150, as discussed above. The RBS 100 may have at least one radio unit 140, which may be controlled by the control unit 110, and may be configured to transmit/receive radio signals on behalf of the RAN towards a mobile communication terminal 101 such as a UE. This radio link between the RBS 100 and the UE 101 is separate from the OAM links 410 and 420 discussed herein. The OAM communication may thus be separate and secure from the regular radio communication between the base station 100 and its connected wireless communication terminals 101. The RBS 100 may comprise an RBS identity 111 which may be a number, name or other label that uniquely identifies the RBS. A typical such identity is a serial number of a physical unit that contain the control unit 110, but it may alternatively be an identity assigned by the network operator, like a name for the RBS site or a network identity related to the RBS like an Ethernet MAC address (unique ID assigned to every Ethernet device when it is manufactured) or a cell identity in a cellular network. In the context of this invention, the identity 111 may be uniquely associated to a list of one-time keys 500 and a pointer 510 as further discussed below. The RBS identity 111 may be generally known by an operator and available from several sources. It may for example be included as part of the documents and/or data needed for visiting an RBS which means that it may be generally easy to obtain already at the office when deciding there is need to visit an RBS 100. Hence obtaining the RBS identity 111 may be a trivial operation. The RBS 100 may, as previously discussed, at least partly comprise the OAM apparatus 150. The RBS may, also in conformity with previous discussions, comprise a local interface 130 for the local OAM link 420.

Figure 4:
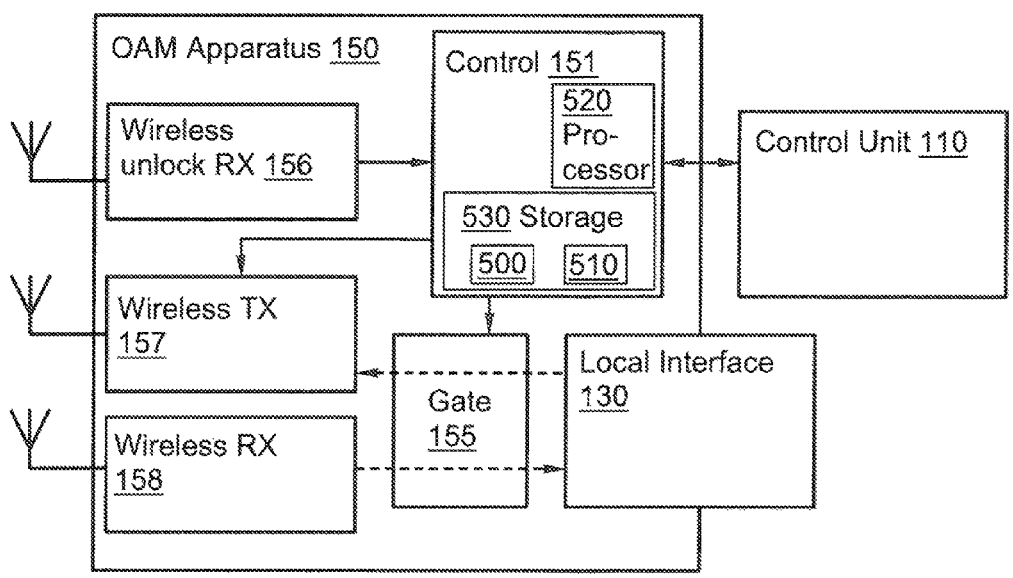
FIG. 4 is a schematic box diagram of an embodiment of an OAM apparatus of the present invention.

FIG. 4 illustrates an embodiment of an OAM apparatus 150 of the present invention.

The OAM apparatus 150 may be a protected wireless interface connected to the local RBS interface 130. The OAM apparatus 150 may comprise a control unit 151 i.a. for protection of the OAM link 420. The control unit 151 may be connected to, or at least partially be a part of the control unit 110 of the RBS 100. The protection control unit 151 may control a gate 155. The gate 155 may be responsible for screening access requests. An authorised/proper access request may be that the control centre 200 orders over the remote OAM link 410 via the RAN interface 120 and/or the RBS control unit 110 that the gate 155 should open e.g. immediately or at a specified time. Another authorised/proper access request may be that the wireless unlock receiver (RX) 156 receives a proper signal. The unlock RX 156 may, e.g. depending on whether the unlock signal 346 is sent via the remote OAM link 410 or the local OAM link 420, be a radio receiver or a receiver for wired communication. In some embodiments a proper signal can be a simple radio carrier, while in others, a proper signal may be a one time key, from a key list. Also, the gate may close in response to one or a mix of conditions, e.g. at a particular time (including zero when applicable i.e. immediately) after one or more of: opening the gate 155, the OAM terminal 300 or control centre 200 connecting to the OAM apparatus 150 and/or the last activity by terminal 300 or after disconnection from the terminal 300. Additionally or alternatively, the OAM terminal 300 or the control centre 200 may order that the gate 155 is closed.

In some embodiments, one or both of the protection control 151 and the gate 155 may be implemented partly or completely as hardware and/or as software in the control unit 110 and/or the local interface 130.

The protected wireless interface 150 may contain a gate 155 which stops access unless protection control 151 allows it. The gate 155 may hence have one state that enables a two-way connection and one state that may cut, disable, not forward or obscure (e.g. not decrypt into proper plaintext data (for example by using an incorrect crypto key) and/or destroy essential parts like the address, header(s), payload or checksum of a packet) depending on whether the access is by an authorised terminal 300.

The OAM apparatus 150 may comprise a wireless receiver (RX) 158 and wireless transmitter (TX) 157 where some embodiments allow control 151 to shut down the TX 157 in order to hide the fact that RBS 100 has a wireless interface at all, during normal operation of the RBS where there is no need for connecting a terminal 300 since it is normally intended for temporary activities like maintenance. The wireless receiver 158 may be the same as, combined with or separate from, the wireless unlock receiver 156. Thus, the unlock RX 156 may be a separate wireless channel or even other wireless media like IR, light/visual or audio but it may also be combined with RX 158. The wireless unlock receiver (RX) 156 may be listening for a proper unlock signal on behalf of protection control 151.

In some embodiments, the gate 155 may be a part of one or both of wireless TX 157 and wireless RX 158.

In some embodiments unlock RX 156 may be part of wireless RX 158 and in an embodiment TX 157 and RX 158 may be a standard 802.11 WLAN transceiver but the unlock RX 156 and/or RX 158 and TX 157 may alternatively be Bluetooth, wireless USB or other standard or non-standardized wireless technologies including optical (IR, visible light, UV). Thus, the unlock RX 156 may use a different communication technology than RX 158 and TX 157 in order to further prevent unauthorised access.

In some embodiments of the present invention, the OAM receiver 156 or 158 may be configured for wirelessly receiving the code key 345 from the OAM terminal 300. Additionally or alternatively, the OAM receiver 156 or 158 may be configured for continuously listening for wireless signalling from the OAM terminal 300, in order to detect any signalling from an authorised terminal 300, even without an active local link 420.

The control unit 151 may comprise a storage unit 530 which may hold a list 500 of one time keys 345 and an active key pointer 510 in order to verify valid authorization from a one-time-key server 240 of the control centre (see FIG. 11) over the direct or indirect one-time-key distribution link 430 (see FIG. 1). The list (500) may be loaded into the control 151 during manufacturing thereof or at a later stage, but those skilled in the art appreciate the need for crafting the list properly and ensuring that all entities involved in handling the lists are part of the security chain required for ensuring that keys may only be handed out by one-time-key server 240.

In some embodiments, the wireless parts i.e. wireless unlock RX 156, wireless TX 157 and wireless RX 158 may be omitted and replaced by a regular wired connection, hence just using the one-time-key mechanism as means to protect an individual RBS 100 from access without approval from one-time-key server 240, where the approval may automatically expire after one use or when a new key is presented.

The control unit 151 may comprise a processing unit 520, such as a central processing unit (CPU) in the form of at least one microprocessor. The processing unit 520 may be configured for running software for controlling the control unit 151.

Figure 5:
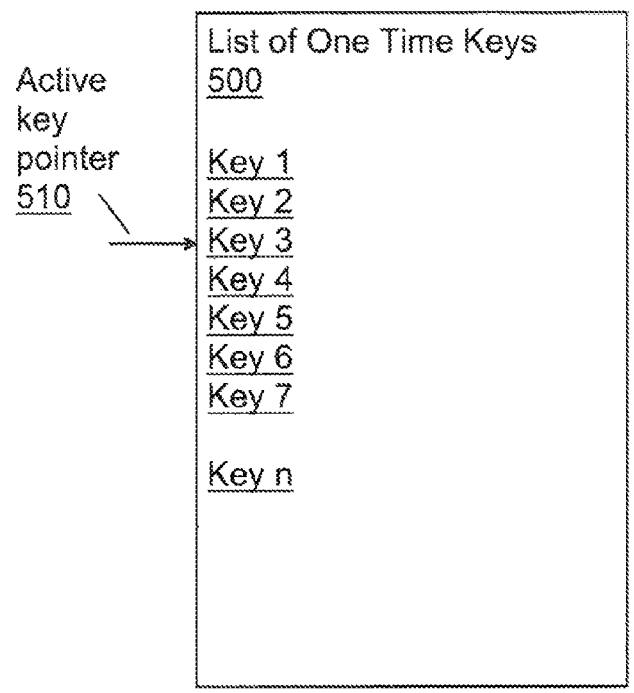
FIG. 5 is a schematic diagram illustrating list of one time keys of the present invention.

FIG. 5 illustrates an embodiment of a list 500 of one-time keys 345 (keys 1 . . . n) which may be used in embodiments of the present invention. A list 500 of keys may be held in the OAM apparatus 150 or RBS 100, as discussed above, and a corresponding list 500 may be held in the control centre 200, as further discussed below.

According to embodiments of the present invention, one-time/single use keys may be used, e.g. as a "password" that expires when used once. An alternative embodiment would be to allow a key to be used more than once, e.g. a specified maximum number of times.

Each RBS identity 111 may be associated to a list 500 that comprises a number of digital keys 345, each e.g. consisting of 256 bits (but there are several other arrangements of lengths and symbol representations possible) crafted in a way making it impossible—or at least infeasible with a reasonable effort—to predict the next key in sequence. Possibly, a list of truly random numbers is used, but more practical implementations may use a cryptographic or pseudorandom algorithm to produce the list 500. This may also give the advantage that a very long list may be stored as just a few input parameters to said algorithm, using the algorithm to create the keys of the list 500 on demand rather than storing all data.

An active key pointer 510 may be used to traverse the list in sequence. Hence, a key may be expired/invalidated by moving the pointer to the next key. All keys after the pointer may be considered expired and may never be used again. Future keys, keys in front of the pointer, may be regarded as non-activated keys. The key or keys pointed to by the pointer may be currently active/valid. Depending on the security level needed as opposed to convenience, more than one key may be valid/active at any one time, such as a fix number of keys, or only one key is allowed to be active/valid at any one time.

Figure 11:
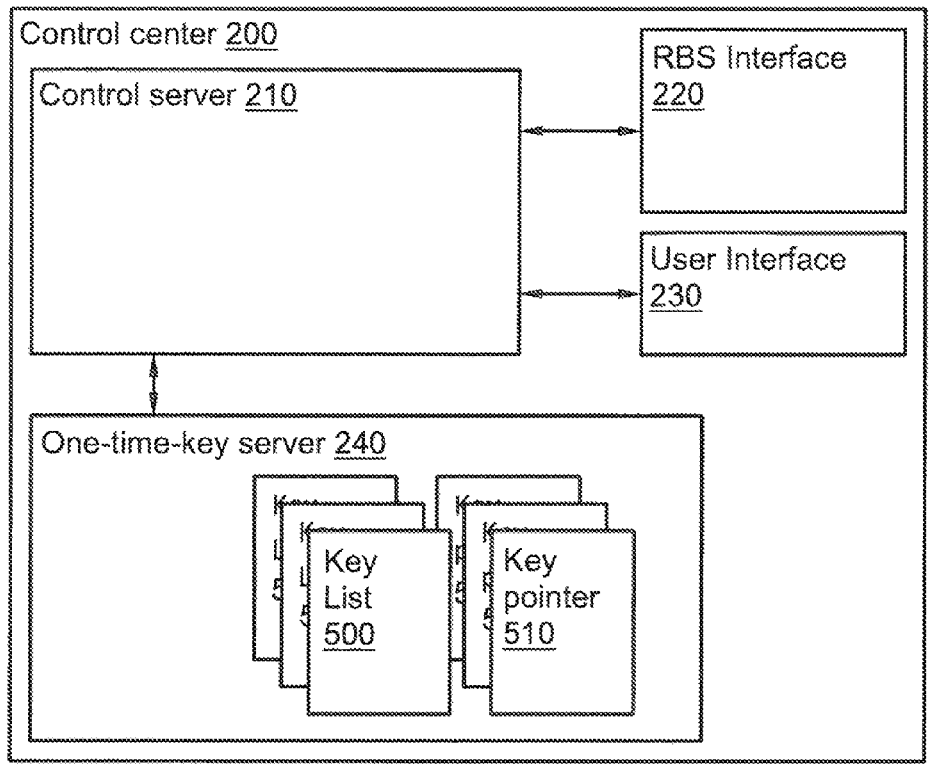
FIG. 11 is a schematic box diagram of an embodiment of a control centre of the present invention.

For each RBS 100, the list 500 and pointer 510 may be allowed to only exist in two copies, one located in the RBS 100 (see FIG. 4) and one in a one-time-key server 240 in the control centre 200 (see FIG. 11). Alternatively, other copies may exist, e.g. for back-up, securely stored.

According to some embodiments, only one (or in some cases a few) key(s) may be handed out by the key server 240 at a time for use by the OAM terminal 300 and/or additional OAM terminal(s) which may require access to the OAM apparatus 150. The OAM terminal may acquire one, typically only one, key 345 from the key server 240 of the control centre 200 and present it to the RBS 100 or OAM apparatus 150 to get access, whereby the RBS 100 or OAM apparatus 150 automatically expire the key by means of the processing unit 520 and the storage unit 530.

Figure 6:
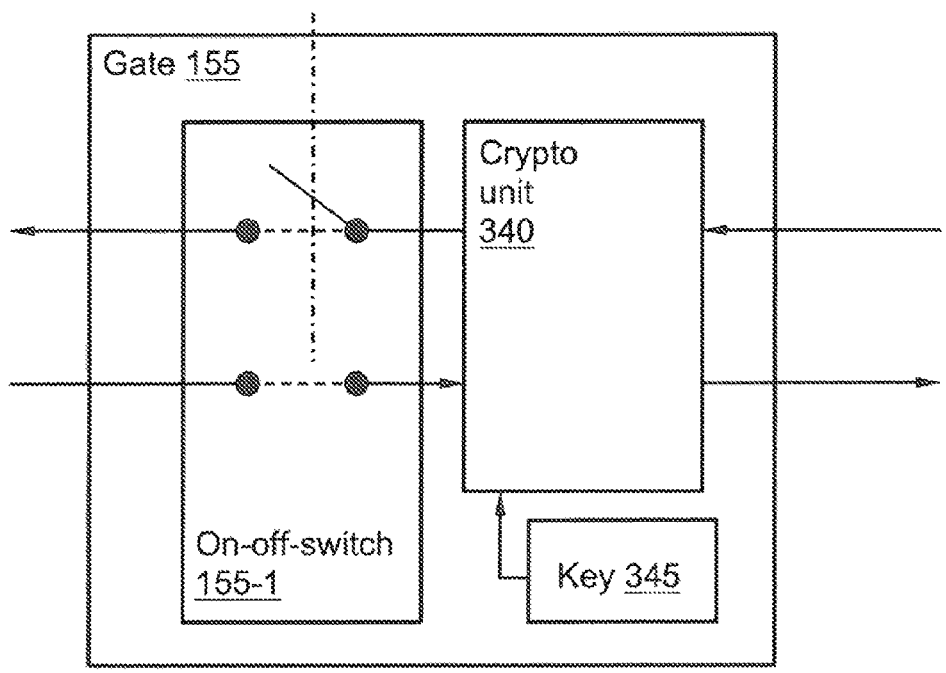
FIG. 6 is a schematic box diagram of an embodiment of a gateway of an OAM apparatus of the present invention.

FIG. 6 illustrates an embodiment of a gate 155, also discussed above, of the present invention. The gate 155 may comprise a switch 155-1 and a crypto unit 340 that encrypts/decrypts data according to an encryption key 345. In some embodiments the switch 155-1 may be indirectly implemented by the crypto unit 340 since a wrong key 345 may result in nonsense data due to improper encryption/decryption. In other embodiments, the crypto unit 340 may be a WLAN, e.g. 802.11i, crypto implementation in a commercially available WLAN solution.

Figure 7:
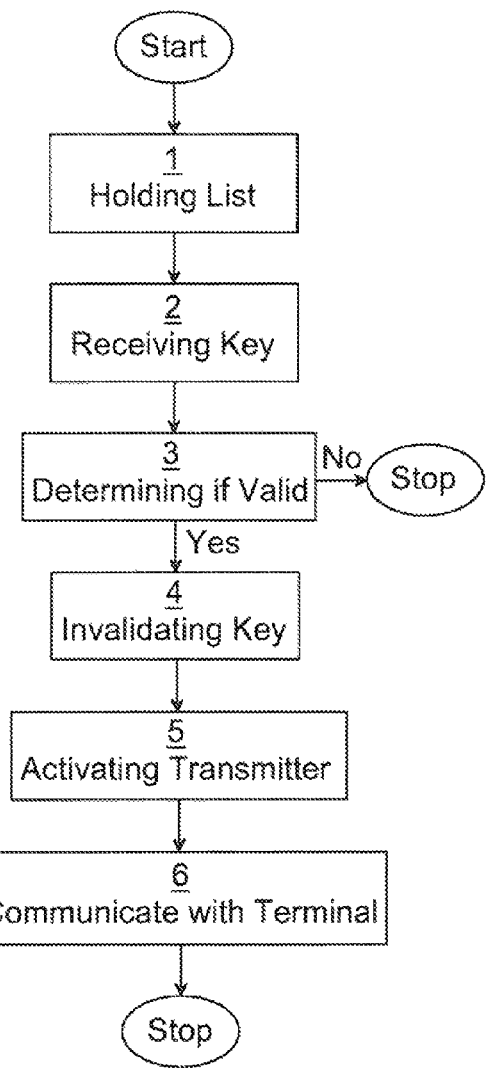
FIG. 7 is a schematic flow chart of an embodiment of a method of an OAM apparatus, of the present invention.

FIG. 7 is a schematic flow chart of an embodiment of a method of an OAM apparatus of the present invention.

The OAM apparatus 150 of the RBS 100, e.g. the storage unit 530, holds (step 1) a list 500 of code keys 345. Of the code keys of the list 500, at least one code key is valid/active. The OAM apparatus 150 receives (step 2), e.g. by means of the unlock RX 156 or the RX 158, an electronic code key 345. As discussed above, the code key may be received from e.g. the OAM terminal 300 or the control centre 200. The OAM apparatus 150 determines (step 3) whether the received code key is valid and thus e.g. sent from an authorised OAM terminal 300, by determining whether the received code key is comprised in the list 500 and is there denoted as valid. If it is determined 3 that the code key is not valid, the method may be stopped and no communication between the terminal 300 and the apparatus 150 may take place or the communication may be nonsense, as discussed above. If the code key is determined 3 to be valid, the OAM apparatus may invalidate (step 4) the code key, e.g. by means of the processing unit 520 acting on the storage unit 530, for repeated use, thus making the code key 345 a one-time use code key. Thus, the processing unit 520 of the apparatus 150 may be configured for invalidating 4 the received 2 code key 345 by updating a key pointer 510 associated with said list 500, the key pointer 510 indicating which of the code keys 345 of the list 500 is/are valid at any given time. An OAM transmitter 157 of the OAM apparatus 150 may be activated (step 5) taking said transmitter from a silent mode to an active mode where said transmitter is allowed to wirelessly transmit signals, upon the OAM apparatus receiving an unlock signal 346. In the silent mode, the transmitter 157 and thus the wireless interface or local link 420 may be hidden and undetectable, preventing unauthorised access to the OAM apparatus. The unlock signal 346 may, as discussed above, be sent wirelessly by the OAM terminal 300 or by wire from the control centre and may or may not comprise the code key 345 received in step 2. The receiving of the key in step 2 and the receiving of the unlock signal referred to in step 5 may thus occur at the same time, or at different times. If the unlock signal is received separately, e.g. from the control centre 200, it may have been received prior to the receiving 2 of the code key, whereby the activating 5 of the transmitter 157 may also have been performed prior to the receiving 2 of the code key. It should thus be noted that the steps of the method as depicted in FIG. 7 may be performed in a different order than depicted. The OAM apparatus 150 may communicate (step 6) with the OAM terminal 300 if it has been determined 3 that the received 2 code key 345 is valid and if the OAM transmitter 157 has been activated 5. The received code key 345 may then be used for encryption of the communication between the OAM terminal 300 and the OAM apparatus 150.

Figure 8:
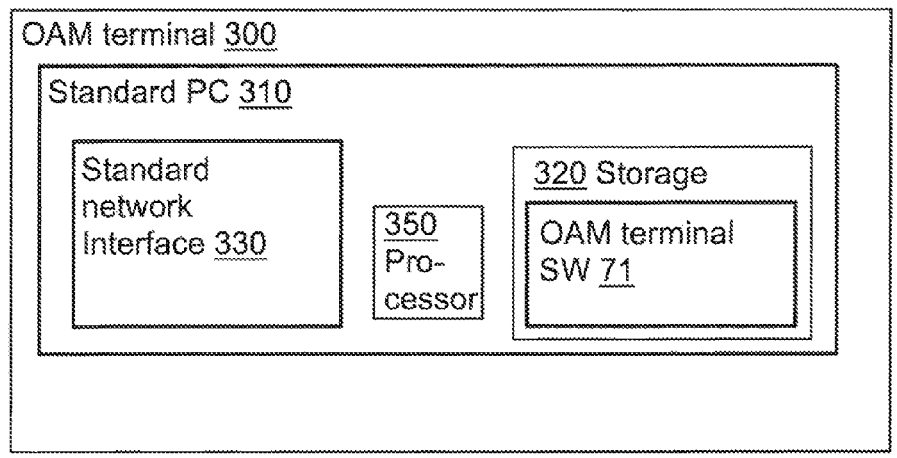
FIG. 8 is a schematic box diagram of an embodiment of an OAM terminal of the present invention.

FIG. 8 illustrates an embodiment of an OAM terminal 300 of the present invention. The terminal 300 may e.g. be a standard laptop, e.g. a PC laptop, a pad or a smartphone, as discussed above. The terminal may comprise a network interface 330, which may be standard or custom, for connection via the local link 420. The OAM terminal 300 may comprise a storage unit 320 which may i.a. hold OAM terminal software 71 e.g. for providing a user interface and/or control/monitor the RBS 100 via the local link 420. The terminal 300 may comprise a processing unit 350, i.a. for running the software 71 of the storage unit 320. The software 71 may e.g. be a loadable program and may be downloaded using well known standard means for conveniently finding and installing apps like Android market and iTunes.

Figure 9:
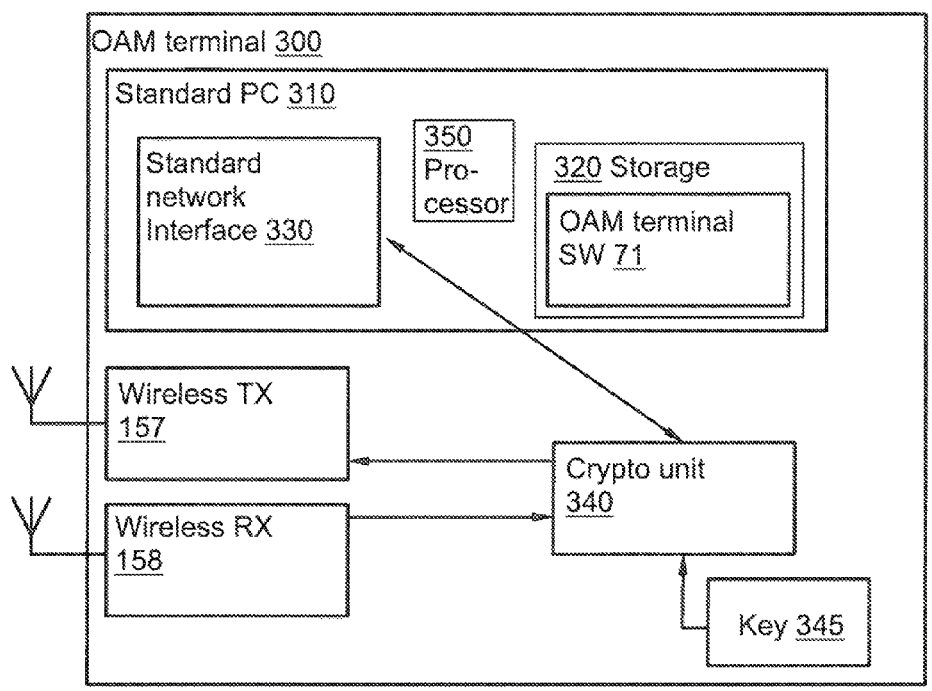
FIG. 9 is a schematic diagram of another embodiment of an OAM terminal of the present invention.

FIG. 9 illustrates a more modified embodiment of an OAM terminal 300 of the present invention. In addition to the components discussed with reference to FIG. 8, the terminal 300 may comprise hardware and/or software to implement a crypto unit 340 with a code key 345 which may match the crypto unit 340 and code key 345 of the OAM apparatus 150 discussed with reference to FIG. 6, in order to secure the local link 420 (shown in FIGS. 1 and 2) with encryption. The terminal 300 may include a wireless TX 157 and RX 158 which may match similar entities of the OAM apparatus 150 discussed with reference to FIG. 4, in order to make the local link 420 wireless. The OAM terminal software 71 and/or a human user provided with instructions/data according to the invention, may control the terminal 300 in methods of the present invention.

Figure 10:
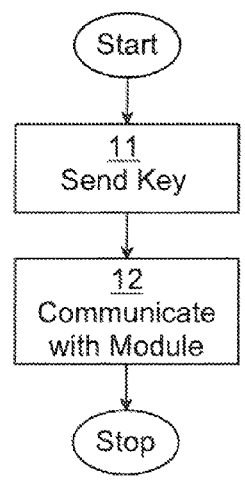
FIG. 10 is a schematic flow chart of an embodiment of a method of an OAM terminal, of the present invention.

FIG. 10 illustrates an embodiment of a method of an OAM terminal 300 of the present invention. The OAM terminal 300 wirelessly sends (step 11) an electronic code key 345 and/or and an identifier 347 for an OAM apparatus 150 of an RBS 100. As discussed above, this sending 11 may be performed without having had any indication of the existence of a local link 420 to the OAM apparatus or the RBS, e.g. the terminal 300 has not received any signal from the apparatus 150 prior to the sending 11, but the operator of the terminal 300 may know that it is possible to activate such a local wireless link 420. The terminal 300 may then start communication (step 12) with the OAM apparatus and/or RBS over the wireless local OAM link 420 after the link 420 has been activated. In the communication 12, the sent 11 code key 345 may be used for encryption of the communication 12 signals, as discussed above.

FIG. 11 illustrates an embodiment of a control centre 200 of the present invention. The control centre 200 may comprise a control server 210, an RBS interface 220 e.g. for the remote OAM link 410 (shown in FIG. 1) to RBS 100 and possibly to further RBSs, and possibly a user interface 230 for human operator(s) (not shown). The control centre 200 may comprise a key server 240 holding at least one, possibly a plurality of key list(s) 500, each with a key pointer 510. Each key list 500 may be related to a particular RBS 100 and may be associated to an RBS identity 111. Each RBS may have an exact copy of its associated list 500 in the key server 240. Each key pointer 510 may be associated to the key pointer 510 in each corresponding RBS 100. As those skilled in the art appreciate, the two entities key server 240 and storage unit 530, each comprising an identical list 500 of keys 345, may use the keys to grant access by e.g.: the server 240 handing out a key to a third party, e.g. the terminal 300 or an operator of the terminal 300, and increment its pointer 510, then using the third party as a virtual link 430 (shown in FIG. 1) where the third party brings/sends 11 said key to the RBS 100 where the receipt 2 of the key itself both confirms to the RBS 100 that the third party has a proper key from the server 240 and that RBS 100 should increment its own key pointer 510 of the storage unit 530. As discussed above, the sending 11 of the key may also act as an unlock signal 346 to activate the local link 420. Those skilled in the art recognize that there may be a need for the RBS 100 to accept one or a few more keys 345 than just the one its pointer 510 points to, to allow for a number of keys to e.g. be lost on the way, without locking out the next valid user or terminal 300.

Thus, the control server 210 may be configured for electronically sending 23 an unlock signal 346 and/or the valid key 345 from a key list 500 to the OAM apparatus 150 of the RBS 100 over an RBS interface 220.

Figure 12:
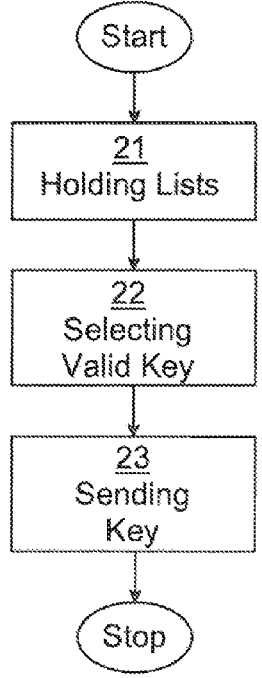
FIG. 12 is a schematic flow chart of an embodiment of a method of a control centre, of the present invention.

FIG. 12 is a schematic flow chart of an embodiment of a method of a control centre 200 of the present invention. The control centre 200 may, e.g. by means of the key server 240, hold (step 21) at least one list 500 of one-time/single use keys 345. The control centre 200 may, e.g. by means of a key pointer 510 associated with the at least one list 500 and possibly by means of the control server 210 acting on the key server 240, select (step 22) a valid key 345 from the list 500. As discussed above, one or a plurality of keys may be valid/active at any one time. The control centre 200 may, e.g. via an RBS interface 220 or a user interface 230, send (step 23) towards the RBS 100 for activating 5 a wireless transmitter 157 of the OAM apparatus 150 and the local wireless link 420 and/or for determining 3 whether or not an OAM terminal 300 is authorised for communication with the RBS 100 or OAM apparatus 150, and/or for encryption of communication between the OAM terminal 300 and the RBS 100 or OAM apparatus 150, as discussed above. The key may be sent 23 e.g. via the wired remote link 410, or via the OAM terminal 300 and possibly via the user interface 230 and an operator of the terminal 300, as discussed above.

Figure 13:
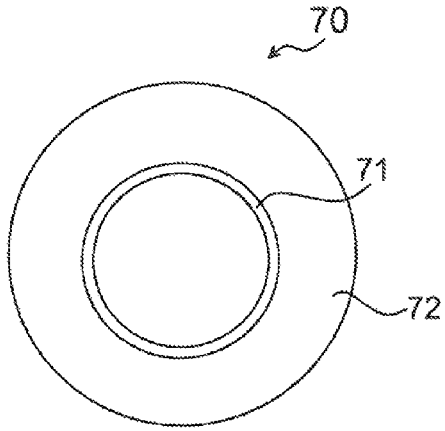
FIG. 13 is a schematic illustration of a computer program product of the present invention.

FIG. 13 is a schematic illustration of a computer program product 70. The computer program product 70 comprises computer executable components 71, e.g. in the form of a computer program 71, and a computer readable medium 72. The computer program or computer executable components 71 may be configured for causing e.g. the OAM apparatus 150, the RBS 100, the OAM terminal 300 and/or the control centre 200 to perform any method of the present invention when run on a processing unit such as the processing unit 520 of the OAM apparatus 150, the processing unit 350 of the OAM terminal 300 or the control server 210 of the control centre 200. The computer program product 70/computer readable medium 72 may e.g. be comprised in a storage unit or memory 320 or 530 comprised in the OAM apparatus 150, the RBS 100, the OAM terminal 300 and/or the control centre 200 and associated with a processing unit 520, 350 thereof. Alternatively, the computer program product 70/computer readable medium 72 may be, or be part of, a separate, e.g. mobile, storage means, such as a computer readable disc, e.g. CD or DVD or hard disc/drive, or a solid state storage medium, e.g. a RAM or Flash memory. The computer program 71 may additionally or alternatively be located on a remote server and may be transferrable to a local memory or storage unit 320 or 530 over a network or data connection.

EXAMPLE 1

Connecting to an RBS Using an Unlock Signal Via the Remote OAM Link

This flow presents an example of connection between the apparatus 150 and the terminal 300 depending on Remote OAM link 410 to be operational.

(Starting state) In some embodiments, wireless TX 157 is effectively off during non-connected operation in order to hide the presence of a wireless interface 420. Gate 155 may additionally be closed.

Control centre 200 sends command(s) over the remote link 410, which are interpreted in RBS 100 by control unit 110 and made effective by Control 151.

Control 151 opens gate 155 and/or activates wireless TX 157 and wireless RX 158.

In some embodiments, gate 155 and OAM terminal 300 may include encryption with key(s) influenced by a one time key executing this sub-flow:

RBS identity 111 is acquired and presented to server 240 to get a one-time-key from list 500. This transaction may be performed over the direct or indirect link 430.

OAM terminal 300 receives said one-time-key and creates encryption key(s) for local link 420.

Control 151 fetches active key(s) from list 500 and creates encryption key(s) used by gate 155 for local link 420. If wrong: stop here due to encryption mismatch, i.e. no access.

In some embodiments, RBS 100 and key server 240 may align their key pointers 510 over remote link 410 in a way that expire all keys that should not be valid anymore, according to methods known by those skilled in the art.

Terminal 300 is connected to RBS local interface 130 and may proceed as a normal OAM terminal 300 over a prior art wired link but using wireless local link 420.

Wait for a condition for RBS 100/apparatus 150 to close the connection, e.g. due to timeout in RBS 100/apparatus 150, end of connection detected by RBS 100/apparatus 150, command from control centre 200 or from OAM terminal 300 to RBS 100/apparatus 150.

Return to starting state, i.e. activate protection (hiding local link 420) again.

EXAMPLE 2

Connecting Locally to RBS

This flow is an example of a generic way to perform the connection between terminal 300 and the RBS 100/apparatus 150, without need for remote OAM link 410.

(Starting state) In some embodiments, wireless TX 157 is effectively off during non-connected operation in order to hide the presence of a wireless local interface 420. Wireless unlock RX 156 may always be receiving though. Gate 155 may be closed.

RBS identity 111 is acquired and presented to server 240 to get a one-time-key from list 500. This transaction is performed over the direct or indirect link 430.

OAM terminal 300 receives said one-time-key.

300 sends said one-time-key over local link 420 to the protected apparatus 150.

Control 151 receives said one-time-key via wireless unlock RX 156 and compares to valid/active key(s) from list 500 according to pointer 510 in apparatus 150. If wrong: stop here, i.e. no access.

Control 151 may open gate 155 and/or activates wireless TX 157.

Terminal 300 may then be connected to RBS local interface 130, possibly via the apparatus 150, and may proceed as a normal OAM terminal 300 over a prior art wired link but using wireless local link 420.

Wait for a condition for RBS 100/apparatus 150 to close the connection, e.g. due to timeout in RBS 100/apparatus 150, end of connection detected by RBS 100/apparatus 150, command from control centre 200 or from OAM terminal 300 to RBS 100/apparatus 150.

In some embodiments, RBS 100 and key server 240 may align their key pointers 510 over remote link 410 in a way that expire all keys that should not be valid anymore, according to methods known by those skilled in the art.

Return to starting state, i.e. activate protection (hiding local link 420) again.

EXAMPLE 3

Using WLAN 802.11 for the Local Link

This example flow employs 802.11 WLAN as the specific means to perform the connection between terminal 300 and the RBS 100/apparatus 150, without need for remote OAM link 410. The wireless parts of the apparatus 150 and OAM terminal 300 may be implemented by standard 802.11 with encryption. That is, all the parts wireless unlock RX 156, Wireless TX 157, wireless RX 158—are typically merged/associated with crypto unit 340.

The properties of 802.11 are known by those skilled in the art, but the relevant parts for this invention are summarized here.

The wireless WLAN is roughly a traditional Ethernet network that is using wireless radio over shared "ether" in the air between the terminals rather than shared "ether" in a coaxial cable. There are some modifications to cope with the wireless nature of the medium though.

A shared "ether" LAN is defined by an SSID (Service Set Identifier) that is a name used by nodes in the same LAN to recognize each other. SSID is typically broadcasted by access point nodes to announce their presence.

A known method to "hide" an access point is to disable broadcast of the SSID. This method is imperfect, since the "secret" SSID is revealed by any node trying to reach the access point—the SSID is effectively broadcasted i.e. leaked to anyone listening during normal use. The method may even worsen the matter since a terminal may have to transmit the "secret" SSID in vain at regular intervals just to see if it is within range of the "secret" access point—effectively broadcasting the SSID all the time even at locations far away from the "secret" access point. This known method though proves that it is possible to connect to a "silent" 802.11 access point that is not broadcasting SSID, by a terminal knowing said SSID—which is needed to implement some embodiments of this invention.

WLAN allows encryption to mitigate the security issues using a wireless medium. The state of the art today is 802.11i and a well known implementation is PKA-PSK2 that may allow the nodes sharing an SSID to share an encryption key that may be distributed to each node by means outside the scope of 802.11i.

Note that terminal 300 may be a COTS (Consumer of the Shelf) laptop, pad or smartphone while the invention may be implemented by OAM terminal software 71 running as a downloaded or by other standard means installed software using standard driver software of the hardware unit to configure the 802.11 hardware and firmware.

In some embodiments, the transmission over the one-time-key distribution link 430 may contain steps to perform the translation into SSID and/or 802.11 key(s), which may allow them to be entered by hand. In that situation it may be possible to use a COTS device without any special software at all, but rather by entering SSID and/or key(s) "by hand from a printed paper" or similar manual methods. In this case, software 71 may be replaced by steps performed in the one-time-key distribution link 430 and/or instructions to the user of OAM terminal 300.

Method Flow:

(Starting state) In some embodiments, RBS 100 creates an SSID with influence from the active/valid key in list 500. This has the advantage of creating an SSID that is effectively impossible to know without knowing the active key according to pointer 510. Those skilled in the art recognize an advantage from creating more than one SSID in this process in order to allow margin for misaligned keys.

RBS creates an 802.11 encryption key with influence from the active key in list 500. As said above, those skilled in the art recognize an advantage from creating more than one key.

In some embodiments, wireless TX 157 is effectively off during non-connected operation in order to hide the presence of a wireless interface. This means SSID is not transmitted by RBS 100. Wireless unlock RX 156 is always receiving though and may accept incoming WLAN packets. Gate 155 is closed.

RBS identity 111 is acquired and presented to server 240 to get a one-time-key from list 500. This transaction is performed over the direct or indirect link 430.

OAM terminal 300 receives said one-time-key 345.

In some embodiments, software 71 creates an SSID with influence from the acquired active key. This SSID will match the (or one of the) SSID(s) created in RBS and is used to configure TX 157 in terminal 300.

Software 71 creates an 802.11 encryption key with influence from the active key and sets it in Key 345 in terminal 300. This key should match the, or one of the, key(s) created in RBS/apparatus 150.

Terminal 300 attempts to connect to RBS 100 over local link 420.

If SSID and encryption key for RBS and terminal 300 really match, there will be an 802.11 connection since this is how 802.11 and 802.11i is supposed to work. If no connection: stop here, i.e. no access.

Terminal 300 is connected to RBS local interface, possibly via the apparatus 150, and may proceed as a normal OAM terminal 300 over a prior art wired link but using wireless local link 420.

Wait for a condition for RBS 100/apparatus 150 to close the connection, e.g. due to timeout in RBS 100/apparatus 150, end of connection detected by RBS 100/apparatus 150, command from control centre 200 or from OAM terminal 300 to RBS 100/apparatus 150.

In some embodiments, RBS 100 and key server 240 may align their key pointers 510 over remote link 410 in a way that expire all keys that should not be valid anymore, according to methods known by those skilled in the art.

Return to starting state, i.e. activate protection (hiding local link 420) again.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An operations, administration and maintenance (OAM) apparatus for a radio base station (RBS), said OAM apparatus comprising: an OAM receiver configured for receiving an electronic code key;
a storage unit comprising a list of code keys of which at least one of said code keys is valid;
a processing unit configured for determining whether a received code key, received by the OAM receiver, is comprised in said list in the storage unit and whether said received code key is valid, and for invalidating said received code key in said list for preventing repeated use if it has been determined that the received code key is valid; and
an OAM transmitter configured for being in a silent mode unless activated to an active mode, where said transmitter is allowed to wirelessly transmit signals, in response to the OAM apparatus receiving an unlock signal;
the OAM apparatus being configured for wireless communication with an OAM terminal over a wireless OAM link if it has been determined that the received code key is valid and if the OAM transmitter has been activated.

2. The OAM apparatus of claim 1, wherein the unlock signal comprises the code key and the OAM transmitter is configured for being activated in response to the processing unit determining that the received code key is valid.

3. The OAM apparatus of claim 2, wherein the OAM receiver is configured for wirelessly receiving the code key from the OAM terminal.

4. The OAM apparatus of claim 1, wherein the OAM receiver is configured for continuously listening for wireless signalling from the OAM terminal.

5. The OAM apparatus claim 1, wherein the OAM apparatus is configured for receiving the unlock signal from a control centre.

6. The OAM apparatus of claim 1, wherein the OAM apparatus is configured for encrypted wireless communication with the OAM terminal over the wireless OAM link.

7. The OAM apparatus of claim 6, wherein the OAM apparatus is configured for using the received code key for encryption and/or decryption in the encrypted wireless communication.

8. The OAM apparatus of claim 1, wherein the processing unit is configured for invalidating the received code key by updating a key pointer associated with said list, the key pointer indicating which of the code keys of the list is/are valid at any given time.

9. The OAM apparatus of claim 1, wherein the OAM apparatus is configured for performing the wireless communication with the OAM terminal in accordance with a wireless local area network (WLAN) communication standard.

10. A radio base station (RBS) for communication with at least one wireless user equipment (UE) over a wireless interface over a radio unit within a wireless communication network, the RBS comprising;
an operation, administration and maintenance (OAM) apparatus including:
an QAM receiver configured for receiving an electronic code key;
a storage unit comprising a list of code keys of which at least one of said code keys is valid;
a processing unit configured for determining whether a received code key, received by the QAM receiver, is comprised in said list in the storage unit and whether said received code key is valid, and for invalidating said received code key in said list for preventing repeated use if it has been determined that the received code key is valid; and
an QAM transmitter configured for being in a silent mode unless activated to an active mode, where said transmitter is allowed to wirelessly transmit signals, in response to the QAM apparatus receiving an unlock signal;
the QAM apparatus being configured for wireless communication with an QAM terminal over a wireless QAM link if it has been determined that the received code key is valid and if the QAM transmitter has been activated, the OAM link being separate from the wireless communication network.

11. A method of an operations, administration and maintenance (OAM) apparatus for a radio base station (RBS), the method comprising:
holding a list of code keys of which at least one of said code keys is valid; receiving an electronic code key determining whether the received code key is comprised in said list and whether said received code key is valid;

invalidating said received code key in said list for preventing repeated use of said received code key, if it has been determined that the received code key is valid;

activating an OAM transmitter of the OAM apparatus, taking said transmitter from a silent mode to an active mode where said transmitter is allowed to wirelessly transmit signals, in response to the OAM apparatus receiving an unlock signal; and communicating with an OAM terminal over a wireless OAM link if it has been determined that the received code key is valid and if the OAM transmitter has been activated.

12. The method of claim 11, wherein the received code key is used for encryption and/or decryption when communicating with the OAM terminal.

13. A non-transitory computer-readable storage medium, which when run on a processing unit included in the an operation, administration and maintenance (OAM) apparatus for a radio base station (RBS), cause the OAM apparatus to perform operations, the operations comprising:

holding a list of code keys of which at least one of said code keys is valid;

receiving an electronic code key;

determining whether the received code key is comprised in said list and whether said received code key is valid;

invalidating said received code key in said list for preventing repeated use of said received code key, if it has been determined that the received code key is valid;

activating an OAM transmitter of the OAM apparatus, taking said transmitter from a silent mode to an active mode where said transmitter is allowed to wirelessly transmit signals, in response to the OAM apparatus receiving an unlock signal; and communicating with an OAM terminal over a wireless OAM link if it has been determined that the received code key is valid and if the OAM transmitter has been activated.

* * * * *